(12) United States Patent
Cifers et al.

(10) Patent No.: US 10,435,117 B1
(45) Date of Patent: Oct. 8, 2019

(54) SECURE ACCESSORY MOUNTING TRACK

(71) Applicant: Luther Cifers, Amelia, VA (US)

(72) Inventors: Luther Cifers, Amelia, VA (US); Daniel Anderson Newman, Salem, VA (US)

( * ) Notice: Subject to any disclaimer, the term of this patent is extended or adjusted under 35 U.S.C. 154(b) by 0 days.

(21) Appl. No.: 16/030,465

(22) Filed: Jul. 9, 2018

Related U.S. Application Data

(60) Provisional application No. 62/530,290, filed on Jul. 9, 2017.

(51) Int. Cl.
*B63B 25/00* (2006.01)
*F16M 13/02* (2006.01)

(52) U.S. Cl.
CPC .......... *B63B 25/002* (2013.01); *F16M 13/02* (2013.01)

(58) Field of Classification Search
CPC .............................. B63B 25/002; F16M 13/02
USPC .......................................................... 224/406
See application file for complete search history.

(56) References Cited

U.S. PATENT DOCUMENTS

| | | | | |
|---|---|---|---|---|
| 2,743,684 A * | 5/1956 | Elsner | .................. | B60P 7/0815 24/265 CD |
| 2,891,490 A * | 6/1959 | Elsner | .................. | B60P 7/0815 24/265 CD |
| 3,713,616 A * | 1/1973 | Bowers | ................. | B60P 7/0815 410/105 |
| 4,020,770 A * | 5/1977 | McLennan | ............ | B60P 7/0815 410/105 |
| 5,259,711 A * | 11/1993 | Beck | ..................... | B60P 7/0815 410/101 |
| 5,533,848 A * | 7/1996 | Davis | .................... | B60P 7/0815 410/104 |
| 5,609,452 A * | 3/1997 | Looker | ................. | B60P 7/0815 244/118.1 |
| 5,823,724 A * | 10/1998 | Lee | ....................... | B60P 7/0815 410/104 |
| 6,163,906 A * | 12/2000 | Kay | ...................... | A61G 7/053 5/658 |
| 6,585,465 B1 * | 7/2003 | Hammond | ............ | B60P 7/0815 410/104 |
| 6,626,623 B2 * | 9/2003 | DeLay | ................. | B60P 7/0815 410/105 |
| 6,644,901 B2 * | 11/2003 | Breckel | ................ | B60P 7/0815 410/104 |

(Continued)

*Primary Examiner* — Nathan J Newhouse
*Assistant Examiner* — Lester L Vanterpool
(74) *Attorney, Agent, or Firm* — Thedford I. Hitaffer; Hitaffer & Hitaffer, PLLC

(57) ABSTRACT

A secure accessory mounting track may comprise an elongated body with a tee-slot formed into the body. At least one end of the tee-slot terminates in an angled slot that may allow entry of device attachment hardware, but which will not permit the device attachment hardware to escape from the track when a device attached to the track is loosened only enough to adjust the position of a device. This fully secures the device along the entire length of the track, even when adjusting the position of the device. Attachment of the device may be achieved by fully tightening the attachment hardware to clamp a retaining flange between the hardware and the device. Removal of the device may require the attachment hardware to be loosened farther than what would be required for adjusting the position of the device.

15 Claims, 6 Drawing Sheets

(56) References Cited

U.S. PATENT DOCUMENTS

| | | | | |
|---|---|---|---|---|
| 6,688,568 B1* | 2/2004 | Moufflet | ............... | A47B 96/067 211/103 |
| 6,712,568 B2* | 3/2004 | Snyder | .................. | B60P 7/0815 410/102 |
| 6,948,895 B2* | 9/2005 | Buff | ...................... | B60P 7/0815 410/102 |
| 7,234,619 B2* | 6/2007 | Hicks | ....................... | B60N 3/00 224/281 |
| 7,517,181 B2* | 4/2009 | Dunaway | ............... | G09F 3/0305 410/104 |
| 7,874,774 B2* | 1/2011 | Peterson | ................ | B60P 7/0815 410/104 |
| 7,950,535 B1* | 5/2011 | Schmid | ................. | A47F 5/0846 211/85.7 |
| 7,980,614 B2* | 7/2011 | Denton | .................... | B60R 7/04 296/24.3 |
| 8,647,009 B2* | 2/2014 | Kobayashi | ............... | F24S 25/61 403/7 |
| 9,671,060 B1* | 6/2017 | Cifers | .................... | F16M 13/02 |
| 9,828,073 B1* | 11/2017 | Cifers, III | ................ | B63B 35/71 |
| 9,999,802 B2* | 6/2018 | Kilmon | ..................... | A63B 7/00 |
| 10,155,306 B1* | 12/2018 | Carnevali | ............... | A47B 95/02 |
| 2005/0180836 A1* | 8/2005 | Dowty | ............... | B64D 11/0696 410/105 |
| 2012/0045276 A1* | 2/2012 | Carnevali | ................. | F16B 7/20 403/350 |
| 2012/0181409 A1* | 7/2012 | Hayahara | ........... | B60N 2/01575 248/429 |
| 2013/0007988 A1* | 1/2013 | Dennison | ................. | A47H 1/04 16/94 D |
| 2018/0347749 A1* | 12/2018 | Carnevali | .......... | F16M 11/2085 |
| 2018/0363842 A1* | 12/2018 | Carnevali | ............ | F16M 13/022 |

* cited by examiner

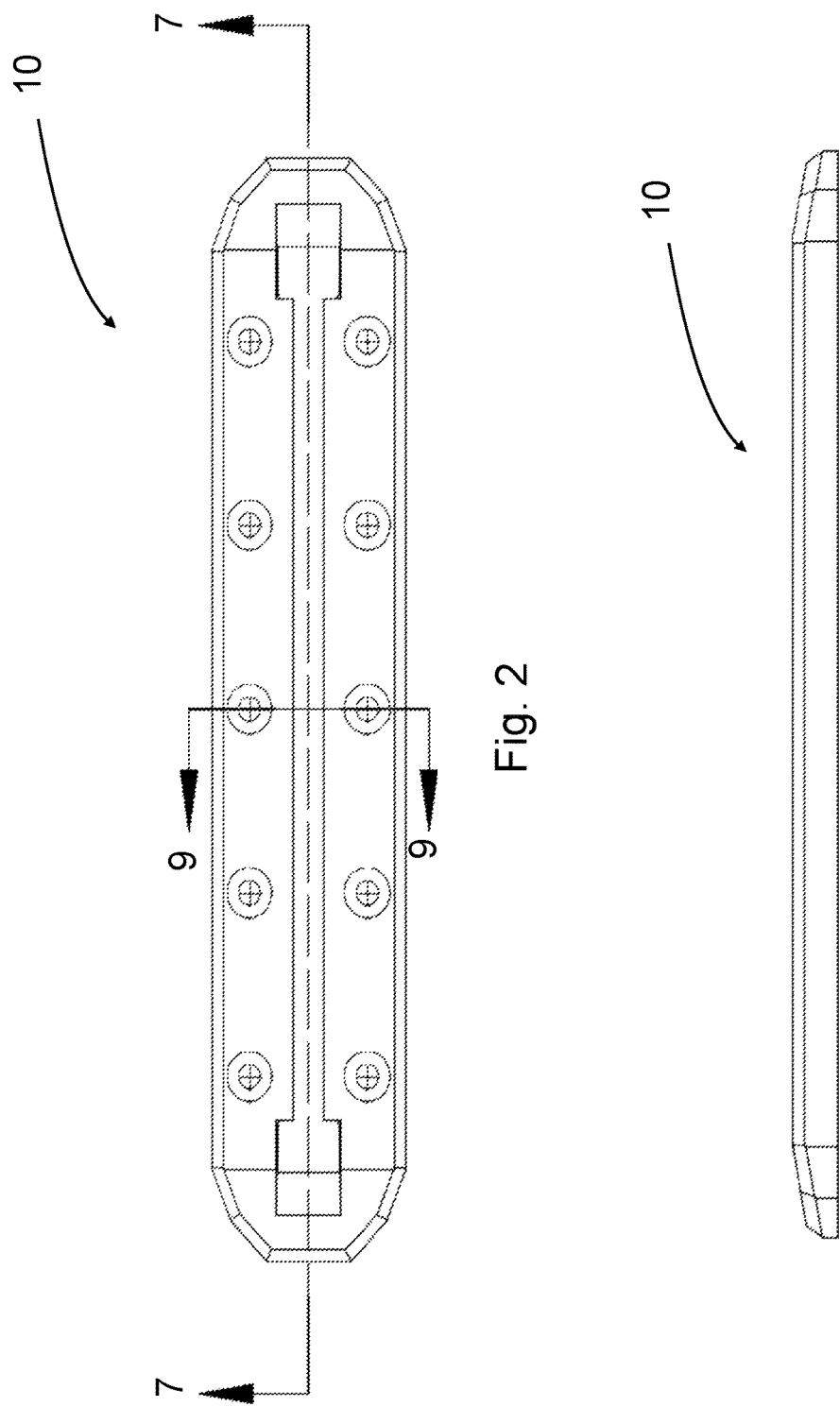

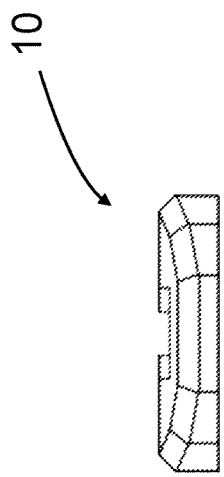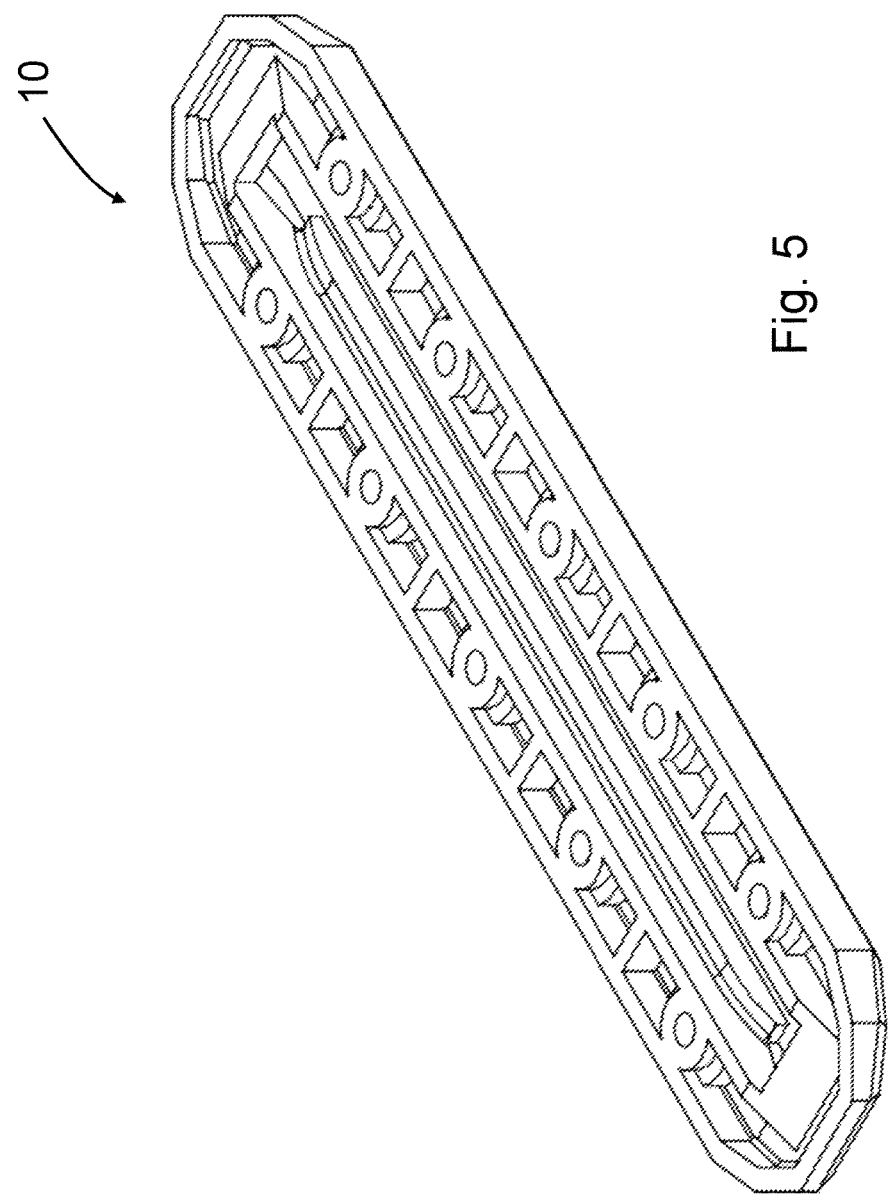

SECURE ACCESSORY MOUNTING TRACK

CROSS-REFERENCE TO RELATED APPLICATIONS

This application claims the benefit of U.S. Provisional Application No. 62/530,290, filed Jul. 9, 2017, the disclosure of which is incorporated herein by reference in its entirety.

BACKGROUND

This invention relates in general to mounts and supports, and, more particularly, to a secure accessory mounting track that may be fixed to supporting environments, such as that of fishing vessels, including kayaks and other watercraft, to provide a plurality of secure attachment points for various accessory devices, and prevent accidental removal of the accessory devices when adjusting their position.

Accessory devices, such as camera mounts, fishing rod holders, personal electronics cradles, marine depth finders, beverage holders, visibility and signaling beacons, whether audible, visible or both, cameras, audio recorders, sensors, writing and marking implements, food and beverage containers and dispensers, fire extinguishers, tools, weapons, merchandise, display items and various other implements, frequently require quick and easy attachment and removal from vehicles and structures, such as personal watercraft, surface and submersible boats and ships, tractors, wagons and carts, construction and earth moving vehicles, all-terrain vehicles, airplanes, automobiles, military vehicles and other vehicles and structures utilizing such devices. Accessory devices may also be used in static structures, such as buildings, indoor or outdoor walls, stairs, bridges, overpasses, tunnels, amphitheaters, sports venues, gazebos, fences, gates, monuments, signs, access control devices, and others, and in structures that are portable but utilized in static settings, such as furniture, display cases, cabinets, housings, and utilitarian items such as tools, instruments, weapons, motorized equipment and others.

In addition to the aforementioned devices, other items associated with various environments are commonly stored, used and organized. Within the scope of this description, the term "device" shall refer to any item that may be stored, used or organized in a given environment, or a bracket designed to support such an item.

In some cases, it may be desirable to alter the deployment of these devices, either by arrangement or position, by connecting them to a track, with the track providing a range of deployment positions that may be altered by loosening the device and sliding it or otherwise repositioning it along the length of the track.

While tracks have been previously utilized in some applications, they generally do not fully secure the device along the entire length of the track. In many tee-slot tracks, the ends of the tee-slot channel are open to allow insertion of device attachment hardware. In these tracks, the device may inadvertently slide out of the end of the track when adjusting its position, particularly, if the device is loosened enough to slide along the track, it may also accidentally slide out of the track in the same way it slid into the track.

To help overcome this, some tracks may have only one entry point. But limiting entry points reduces versatility, and although it reduces the number of instances of openings in which the device may accidentally slip out, it does not eliminate the underlying problem.

In light of the above, there is a need for a secure accessory mounting track that provides security for devices along the entire length of the track, to prevent accidental removal of the device while adjusting the position of the device.

SUMMARY OF THE INVENTION

The present invention relates to a secure accessory mounting track, that provides quick and easy removable attachment and positioning of various devices, and that offers security so that devices are not accidentally removed when adjusting their position.

Various advantages of this invention will become apparent to those skilled in the art from the following detailed description of the preferred embodiment, when read in light of the accompanying drawings.

BRIEF DESCRIPTION OF THE DRAWINGS

Various features and attendant advantages of the seat will become more fully appreciated when considered in view of the accompanying drawings, in which like reference characters designate the same or similar parts and/or features throughout the several views, and wherein:

FIG. 2 is a top plan view of the secure accessory mounting track shown in FIG. 1;

FIG. 3 is an elevational view of the side of the accessory mounting track shown in FIG. 1;

FIG. 4 is an elevational view of the end of the accessory mounting track shown in FIG. 1;

FIG. 5 is a bottom perspective view of the accessory mounting track shown in FIG. 1;

DETAILED DESCRIPTION OF THE PREFERRED EMBODIMENT

Figure 1:
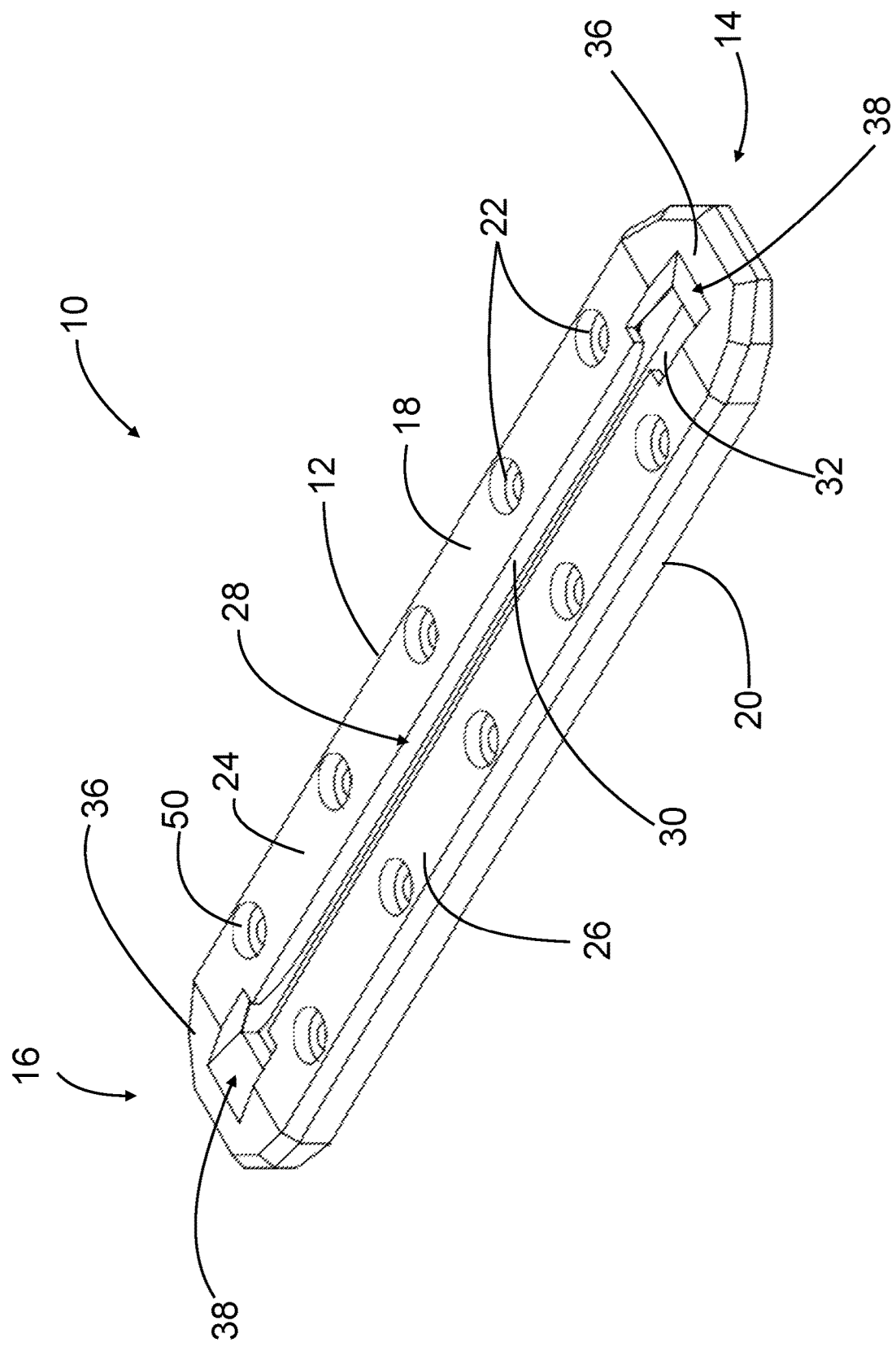
FIG. 1 is a top perspective view of an exemplary accessory mounting track.
Figure 6:
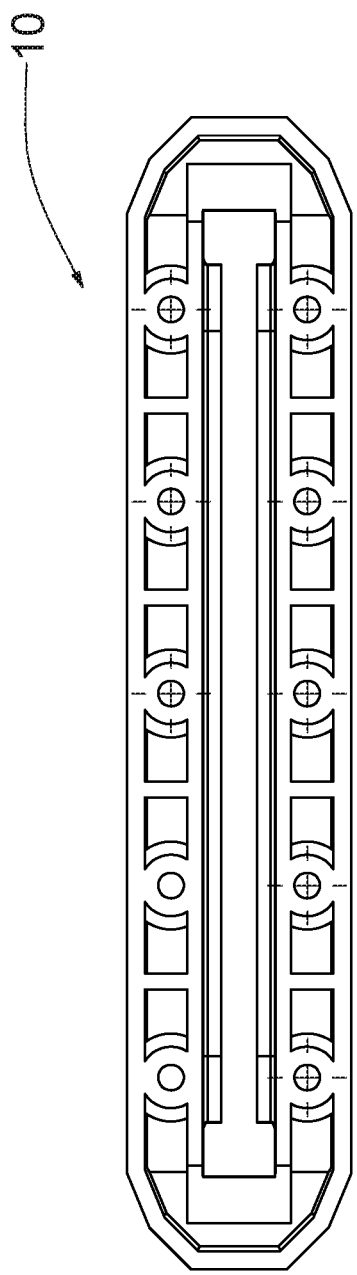
FIG. 6 is a bottom plan view of the accessory mounting track shown in FIG. 1.
Figure 7:
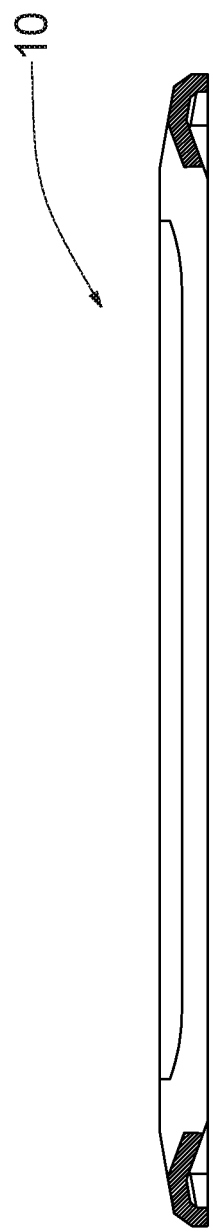
FIG. 7 is a cross-sectional view of the accessory mounting track taken along the line 7-7 in FIG. 2.

Now with reference to the drawings, there is illustrated in the drawings a secure accessory mounting track 10, that provides quick and easy removable attachment and positioning of various devices (not shown), and that offers security so that devices are not accidentally removed when adjusting the position of the devices.

For clarity and convenience, this description describes the track 10 oriented such that the track 10 may be attached to the top of a substantially horizontal supporting surface. Terms like "top" and "bottom" or "upper" and "lower" or "left" and "right" are used with respect to this description. Further, terms like "proximal" and "distal" are used for semantic convenience only. It should be understood that the track 10 may, of course, be attached in many physical orientations without altering the scope of the invention.

The track 10 may comprise an elongated body 12 with a proximal end 14, a distal end 16, an upper surface 18, a lower surface 20, and at least one attachment hole 22. The track 10 may be divided along the length of the track 10 into a left side or section 24 and a right side or section 26 by an inverted tee-shaped slot (i.e., a tee-slot 28). The tee-slot 28 comprises a narrow slot 30 atop a wide slot 32. The track 10 is dimensioned and configured to accommodate connecting hardware H (shown in FIGS. 10-12), such as a tee-bolt, having a head and a shaft. The narrow slot 30 is dimensioned and configured to receive the shaft and the wide slot 32 is dimensioned and configured to receive the head.

The narrow slot 30 and the wide slot 32 may be approximately and vertically centered with one another. The bottom of the wide slot 32 may be open and in abutment to the lower surface 20 of the track 10. The top of the wide slot 32 may be open and in abutment to the bottom of the narrow slot 30. The top of the narrow slot 30 may be open and in abutment to the upper surface 18 of the track 10. The difference in the respective widths of the wide slot 32 and narrow slot 30 may form a retaining flange 34 (shown in FIG. 8) on both sides of the narrow slot 30, above the wide slot 32.

The left section 24 and the right section 26 of the track 10 may be joined at the proximal end 14 and the distal end 16 of the track 10 by connecting walls 36, substantially fixing the distance between the left section 24 and the right section 26, and in doing so, also fixing the width of both the narrow slot 30 and wide slot 32. The connecting walls 36 may also terminate the tee-slot 28 near both the proximal end 14 and distal end 16 of the track 10.

Figure 8:
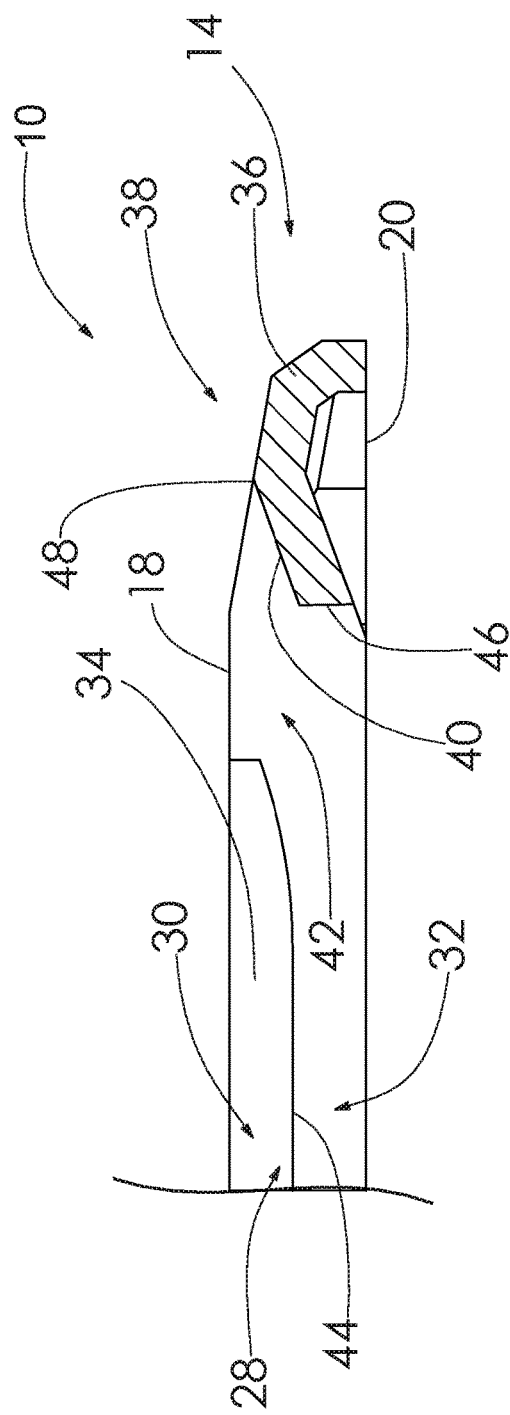
FIG. 8 is an enlarged portion of the cross-sectional view shown in FIG. 7.
Figure 9:
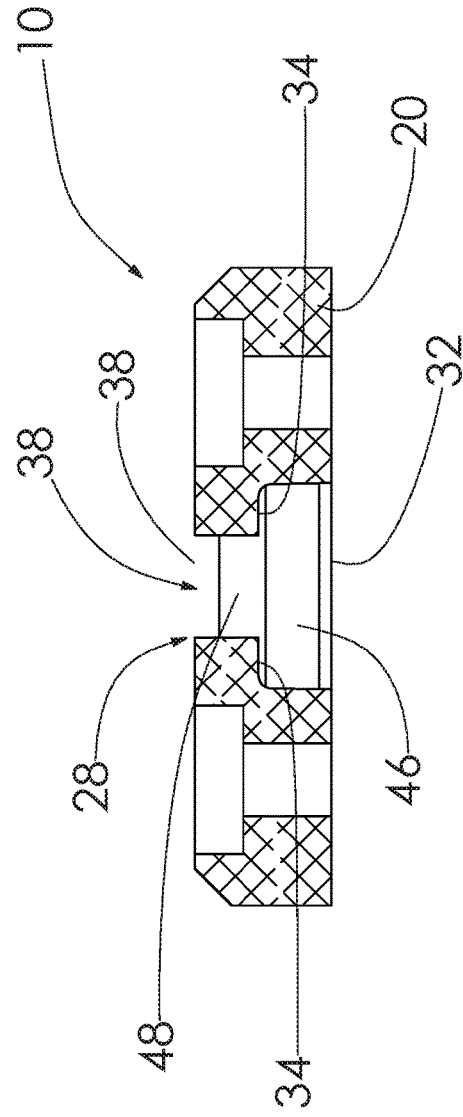
FIG. 9 is an enlarged cross-sectional view of the accessory mounting track taken along the line 9-9 in FIG. 2.

An entry slot 38 may be present near either the proximal end 14, the distal end 16, or both ends 14, 16 of the track 10, and may be formed into the connecting wall 36. Referring particularly to FIG. 8, the entry slot 38 may have a bottom surface 40 that may terminate at one end into an opening 42, which is open to the tee-slot 28. The entry slot 38 is a relatively wide slot, which is wider than the narrow slot 30.

As clearly shown in FIGS. 10-12, an end of the bottom surface 40 of the entry slot 38 that is closest to the tee-slot 28 may be below a bottom surface 44 of the retaining flange 34, so that a stop wall 46 may be present, and may terminate in abutment to the lower surface 20 of the track 10 on a lower end of the stop wall 46, and in abutment to a lower end of an angled surface 48 at an upper end of the stop wall 46. The stop wall 46 may be substantially perpendicular to the lower surface 20 of the track 10. The entry slot 38 may allow the insertion and removal of connecting hardware H, such as a tee-bolt, into the tee-slot 28 but may be arranged with respect to the retaining flange 34 so that the connecting hardware H can only be inserted or removed if device D is sufficiently loosened from the connecting hardware H, as shown in FIG. 12. When the connecting hardware H is only loosened enough to position the device D along the length of the tee-slot 28, as shown in FIG. 11, the connecting hardware H may interfere with the stop wall 46, as shown in FIG. 11, preventing the connecting hardware H from being accidentally removed from the track 10. In order to fully remove the connecting hardware H from the track 10, it must be further loosened, until the edge of the connecting hardware H closest to the stop wall 46 is positioned above the stop wall 46, and the connecting hardware H is aligned with the angle of the entry slot 38 enough to remove the connecting hardware H, as shown in FIG. 12.

The track 10 may contain one or more attachment holes 22 for attaching the track 10 to a supporting environment. The attachment holes 22 may be linearly disposed along the outer edges of the left section 24 and right section 26 of the track 10, and may include a counter-bore or counter-sink feature 50 to allow attachment fasteners (not shown) to be mounted below the upper surface 18 of the track 10. The length of the track 10 may vary, as may the number of attachment holes 22.

It should be understood that each attachment hole 22 accommodates a fastener. The attachment holes 22 extend from the upper surface 18 of the elongated body 12 to the lower surface 20 thereof. The attachment holes 22 may include a bevel or counterbore or countersink 50 (shown in FIG. 1) at the upper surface 18 of the elongated body 12, for receiving countersunk fasteners.

It should also be understood that the track 10 may be attached to a supporting environment using any suitable fasteners along any suitable portion of the track 10, such as by providing counter-sink features within the track, such as along the bottom of the track accessible through the slot 30.

The track 10 composition may be of a substantially rigid and lightweight material, such as aluminum or plastic or hardened rubber, or other materials or a composite comprising two or more materials. The surface of the track 10 may be treated for harsh environmental exposure, such as UV radiation and saltwater. The upper surface 18 of the track 10 may have a texture to improve the gripping characteristics of that surface 18, which may increase the resistance of accessories mounted to that surface 18 from slipping, either by rotation or linearly along the axis of the track 10. This texture may be the result of geometry in the track shape, such as ridges or grooves in the surface 18. Alternately or in addition to this geometry, the texture may be the result of etching, application of plastic or rubberized coating, or other surface treatments.

Attachment of a track 10 to the environment may be achieved by passing fasteners (not shown) through one or more of the attachment holes 22 and into a receiving feature on the surface on which the track is to be mounted. In some configurations, the track 10 may be attached to an adapter bracket, such as a rail clamp (not shown), for attachment to the environment.

One method of attaching a device to a track 10 comprises the step of partially threading a tee-bolt, which may have a head on one end and threaded stud on another end, into threads that may be formed into or otherwise attached to the device, inserting the head of the tee-bolt into a tee-slot 28 in the track 10, and rotating the device. The interaction between the threads in the device and those on the tee-bolt urges the head of the tee-bolt towards the device, thus causing the head of the tee-bolt to make contact with the inside of the tee-slot 28 and causing the device to make contact with the upper surface 18 of the track 10. Further rotation of the device creates pressure on these surfaces of contact, the resulting friction of which, with reasonable tightening force, is adequate to inhibit rotation of the device in either the tightening or the loosening direction or from slipping linearly along the track 10. Previously mentioned texture on the mounting surface of the track 10 may increase this friction.

Another method of attaching a device to a track 10 involves sliding a track nut into a linear channel in a track 10 and inserting a threaded screw or other fastener through a device and threading it into the track nut until the device is tightened to the track 10.

With either attachment, it should be understood that, in order to position a device along the length of the track 10, the device must be loosened enough to allow the device to slide along the track 10. In this mode, the entry slot 38 and stop wall 46, as described above, are configured to prevent the device from being accidentally detached from the track 10, until the device is further loosened, which then allows it to be removed.

Figure 10:
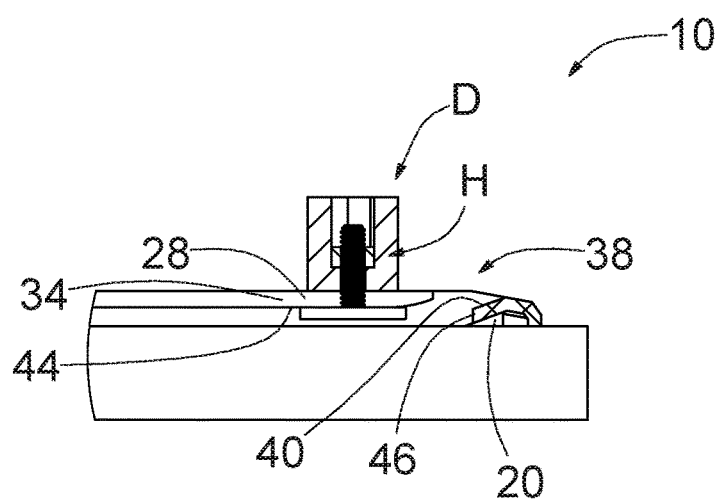
FIG. 10 is an environmental cross-sectional view of the accessory mounting track shown in FIG. 8, further showing in diagrammatic form connecting hardware holding a device in close relationship to the track.
Figure 11:
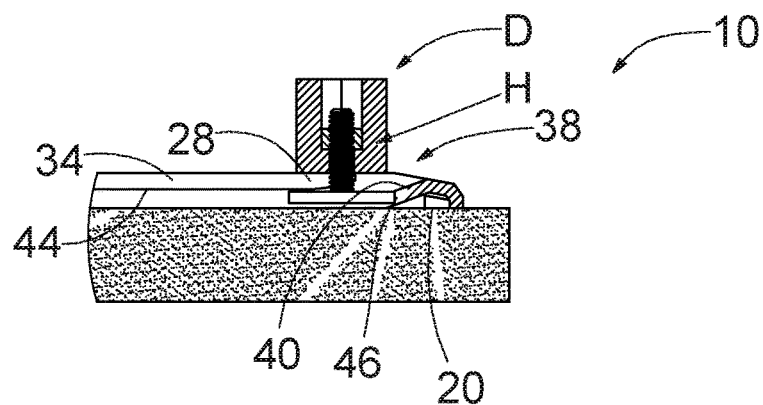
FIG. 11 is an environmental cross-sectional view of the accessory mounting track as shown in FIG. 10, but showing in diagrammatic form the connecting hardware loosened only sufficiently to allow the device to be adjusted in relation to the track but not sufficiently loosened to allow the connecting hardware to be removed from the track.
Figure 12:
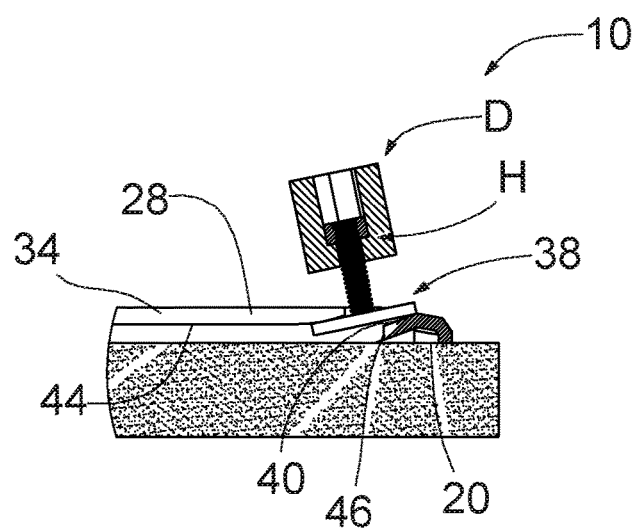
FIG. 12 is an environmental cross-sectional view of the accessory mounting track as shown in FIGS. 10 and 11, but further showing in diagrammatic form the connecting hardware loosened sufficiently to allow the connecting hardware to be removed from the track.

FIGS. 10-12 show progressive insertion of an engagement element of a device being supported on the track 10. In this example, the engagement element is a tee-bolt 64 including a relatively wide head 52 and a relatively narrow neck 54. Referring also to FIG. 1, neck 54 passes through the narrow slot 30 of the tee-slot 28. In FIG. 10, tee-bolt 64 has been inserted into entry slot 38. In FIG. 11, tee-bolt 64 is advanced into the entry slot 32 to the point that it projects below lower surface 20 of the elongated body 12, and is able to be rotated into alignment with the relatively narrow slot 30. Note that this can happen only when the track 10 is released from tight engagement with a supporting environmental surface 68. The consequence of this geometry is that once engagement element fully occupies the relatively narrow slot 30 and the track is secured to the supporting environmental surface 68, the engagement element is constrained against all movement along the relatively narrow slot 30. In FIG. 12, head 52, after insertion through entry slot 38 (insertion is shown in FIG. 10), occupies wide slot 32. Track 10 can now be secured to the supporting environmental surface 68.

As seen in FIG. 10, the relatively narrow slot 30 has a first height 62. An engagement element (e.g., a tee-bolt 64) of an accessory inserted into the relatively narrow slot 30 has a second height 66 about equal to the first height 62. As called out in FIG. 11, the elongated body 12 may comprise an inclined ceiling (i.e., the 40) parallel to and above an inclined floor 70. The inclined ceiling and the inclined floor 70 determine the height 66 of the relatively wide entry slot 38.

While a bottom surface of the track has been presented herein as being planar, other configurations are possible. The bottom surface may be curved or otherwise configured to cooperate with a non-planar supporting environmental surface. Cooperation does not necessarily imply that the bottom surface of the track exactly reproduces contours of the environmental surface.

While the track and may have been described herein in terms of certain features being referred to in either the singular or the plural, other arrangements are possible. For example, it is to be understood that due to the conceptual description presented herein, components presented in the singular may be provided in the plural, and vice versa.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A secure accessory mounting track for mounting to an environmental surface and receiving an accessory adjustably positionable along the secure accessory mounting track, the secure accessory mounting track comprising:

an elongated body including at least one end and an upper surface, the upper surface being configured to engage the accessory;

a relatively narrow slot configured to provide a passage for a relatively narrow portion of a connecting hardware for engagement with the accessory for securing the accessory in relation to the secure accessory mounting track;

a relatively wide slot beneath the relatively narrow slot, the relatively narrow slot extending from the upper surface of the elongated body to the relatively wide slot, the relatively wide slot being configured to receive a relatively wide portion of the connecting hardware;

a relatively wide entry slot that opens to an exterior of the elongated body proximate the at least one end of the elongated body and extends at an angle to the relatively wide entry slot, the relatively wide entry slot being at least defined by an angled surface; and a stop wall at a lower terminal end of the angled surface, whereby the stop wall prevents removal of the connecting hardware from the track unless an edge of the relatively wide portion of the connecting hardware closest to the stop wall is positioned above the stop wall, and the relatively wide portion of the connecting hardware is sufficiently aligned with an angle of the angled surface.

2. The secure accessory mounting track of claim 1, wherein the relatively wide entry slot is a first relatively wide entry slot and the at least one end is a proximal end of the elongated body, and the elongated body further comprises a second relatively wide entry slot at a distal end of the elongated body opposite the proximal end.

3. The secure accessory mounting track of claim 1, wherein the relatively narrow slot and the relatively wide slot cooperatively form an inverted tee-slot for receiving the connecting hardware, which is in the form of a tee-bolt.

4. The secure accessory mounting track of claim 1, wherein the relatively narrow slot and the relatively wide slot are vertically centered with one another.

5. The secure accessory mounting track of claim 4, wherein a top of the relatively wide slot opens in abutment to a bottom of the relatively narrow slot, and a top of the relatively narrow slot opens in abutment to the upper surface of the elongated body.

6. The secure accessory mounting track of claim 5, wherein the elongated body further includes a lower surface and a bottom of the relatively wide slot opens in abutment to the lower surface.

7. The secure accessory mounting track of claim 6, wherein the relatively narrow slot has a width and the relatively wide slot has a width and a difference in the widths define a retaining flange.

8. The secure accessory mounting track of claim 7, wherein the relatively narrow slot and the relatively wide slot cooperatively form an inverted tee-slot for receiving the connecting hardware, which is in the form of a tee-bolt, and wherein an end of a bottom surface of the relatively wide entry slot that is closest to the tee-slot is below a bottom surface of the retaining flange, and the stop wall terminates in abutment to the lower surface of the elongated body at a lower end of the stop wall and in abutment to a lower end of the angled surface at an upper end of the stop wall.

9. The secure accessory mounting track of claim 8, wherein the stop wall is perpendicular to the lower surface of the elongated body.

10. The secure accessory mounting track of claim 1, a length of the elongated body is divided into a first section and a second section by the relative narrow slot and the relatively wide slot, and the first section and the second section are joined at the proximal end and the distal end by connecting walls.

11. The secure accessory mounting track of claim 1, wherein the elongated body is structured and configure to accommodate at least one fastener for mounting to an environmental surface.

12. A secure accessory mounting track for mounting to an environmental surface and receiving an accessory adjustably positionable along the secure accessory mounting track, the secure accessory mounting track comprising:
   an elongated body including a proximal end, a distal end, an upper surface, a lower surface, and accommodation for at least one fastener for mounting the secure accessory mounting track to the environmental surface;
   a relatively narrow slot configured to provide a passage for a shaft portion of a tee-bolt for engagement with the accessory for securing the accessory in relation to the secure accessory mounting track;
   a relatively wide slot beneath the relatively narrow slot, the relatively narrow slot extending from the upper surface of the elongated body to the relatively wide slot, the relatively wide slot being configured to receive a head portion of the tee-bolt; and
   a relatively wide entry slot proximate each the proximal end and the distal end and configured to receive the head portion of the tee-bolt, wherein the relatively wide entry slot opens to an exterior of the elongated body, and wherein the relatively wide entry slot is defined at least in part by an angled surface a lower end of which terminates at a stop wall, and further wherein the relatively wide entry slot prevents removal of the tee-bolt from the track unless an edge of the head portion of the tee-bolt closest to the stop wall is positioned above the stop wall, and the head portion of the tee-bolt is sufficiently aligned with an angle of the angled surface.

13. The secure accessory mounting track of claim 12, wherein the accommodation for at least one fastener comprises a plurality of holes extending from the upper surface of the elongated body to the lower surface of the elongated body.

14. The secure accessory mounting track of claim 13, wherein each one of the plurality of holes includes a bevel at the upper surface of the elongated body, for receiving countersunk fasteners.

15. The secure accessory mounting track of claim 12, wherein the stop wall is perpendicular to the lower surface of the track.

* * * * *